H. D. ROGERS.
BEE ESCAPE.
APPLICATION FILED MAY 8, 1920.
1,423,883.
Patented July 25, 1922.
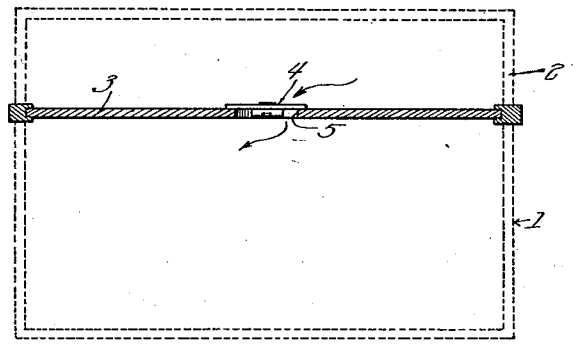
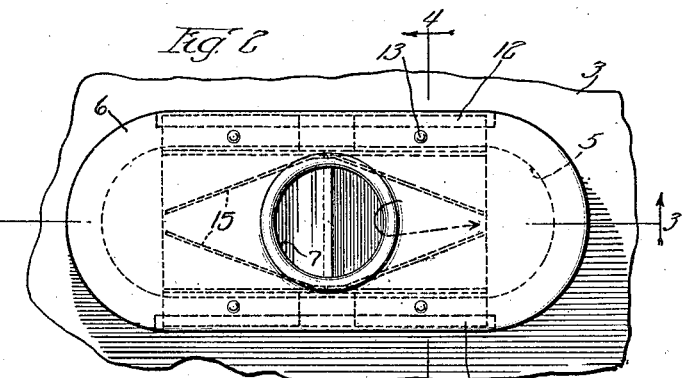
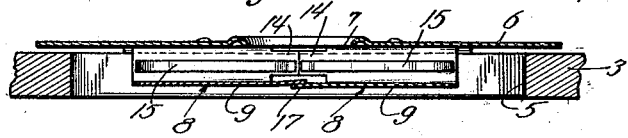
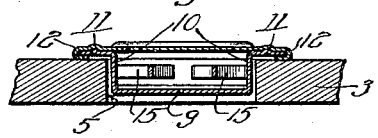
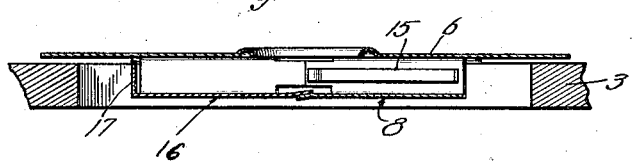
Inventor
Herbert D. Rogers

UNITED STATES PATENT OFFICE.

HERBERT D. ROGERS, OF LEWISTOWN, ILLINOIS.

BEE ESCAPE.

1,423,883.  Specification of Letters Patent.  Patented July 25, 1922.

Application filed May 8, 1920. Serial No. 379,693.

*To all whom it may concern:*

Be it known that I, HERBERT D. ROGERS, a citizen of the United States, and a resident of Lewistown, in the county of Fulton and State of Illinois, have invented certain new and useful Improvements in Bee Escapes, of which the following is a specification.

This invention relates to a device known in the art of bee culture as a bee escape, and serves a definite purpose in connection with a beehive, and affording means for permitting bees to escape from one portion of the hive to another when it is desired to remove a section of the hive for the purpose of obtaining the honey therefrom.

The present invention pertains to an improvement in the construction of devices of the character described, and which form the subject matter of three prior patents, to-wit: No. 489,754 granted to Rufus Porter, No. 987,256 granted to Edmond C. Porter, and No. 1,089,157 granted to me.

The object of the present invention is to provide a simpler and less expensive construction for these devices whereby a smaller number of parts are used and involving a less number of operations and expenditure of labor.

The invention is hereinafter fully set forth in connection with the accompanying drawings, in which—

Fig. 1 is a view in longitudinal section of an enclosure representing a beehive, showing a bee escape board introduced between two sections of the hive.

Fig. 2 is a full sized representation of a bee escape shown in top plan view,

Fig. 3 is a view in longitudinal section of a bee escape taken on line 3—3 of Figure 2, Fig. 4 is a cross sectional view taken on line 4—4 of Figure 2, and Fig. 5 is a view in longitudinal section similar to Figure 3, showing a modified construction of a bee escape and having a single exit.

In Figure 1 is illustrated what may be said to represent a beehive consisting of a lower and relatively deep section 1, ordinarily known as the brooder, and an upper and relatively shallow section termed the super 2. Persons familiar with the care of bees are well aware that the lower section or brooder 1 of the hive is that portion in which the bees store the honey for food purposes during the winter months, and that the super 2 is filled by the bees with the excess honey which is removed from time to time and used for human consumption. As the time approaches for the removal of the honeycombs within the super, it is desirable to place a partition between the brooder and the super, this being done by raising the super slightly and inserting a board 3 between them, this board being termed an escape board for the reason that this board is provided with a bee escape 4 which is a device which permits the bees to pass downwardly from the super into the brooder, but prevents them from returning into the super by passing through the exit in the opposite direction.

The bee escape 4 is usually constructed of sheet metal such as tin, and fits within a slot 5 usually located at the central portion of the escape board 3. The bee escape comprises generally a base plate 6 of any suitable shape, though preferably somewhat elongated and rounded at its ends. At the center of the base plate is formed a circular aperture 7 having slightly rounded edges, this aperture forming the inlet opening for the bees in passing through the device. Below the base plate and accessible through the inlet opening 7 is a horizontal passage extending longitudinally of the base plate and formed by means of channel shaped members or plates 8—8, each comprising a bottom wall 9 and side walls 10—10, the latter being disposed inwardly a short distance from the longitudinal edges of the base plate, and provided with integral flanges 11—11 which lie flatwise against the marginal portions of the said base plate. The channel members 8—8 are fixed to the base plates by the provision of integral strips of metal 12—12 extending along the longitudinal edges of the base plate, and which are turned downwardly and inwardly over the edges of the flanges 11—11 in the process of assembling the parts, the overlapping portions being firmly pressed or crimped together and their relative movement further prevented by stamping or punching the metal at several points as at 13 adjacent to the crimped edges, thus tending to prevent the sliding movement of the channel members relative to the base plate. The channel members 8—8 are preferably identical in construction, each being provided at their inner ends with vertically arranged tongues 14—14 forming continuations of the side walls 10—10, there being soldered or otherwise secured to these tongues pairs of light springs or escapement members 15—15 which converge as they approach the opposite ends and terminate in closely spaced relation. The purpose of these spring escapement members 15—15 is to permit the bees to pass through the passage in either direction toward the exits and in so doing separate the escapement members, permitting them to enter the brooder immediately below. Having passed the escapement members, the latter return to their original positions, thus preventing the bees from entering the passage again from the opposite direction.

In constructing and assembling the device, the channel members 8—8 having been stamped or pressed into proper form and the escapement members soldered to the tongues 14—14 thereof, two of the channel members are applied to the base plate with their corresponding ends in abutting relation with each other, said abutting ends being located immediately below the inlet opening 7 of the base plate. As a preferable construction, the bottom walls 9—9 overlap each other slightly as at 17 (Figure 3) thus insuring a connection between these parts. The assembly is completed by crimping the edges of the base plate over the flanges 11—11 of both channel members 8—8 as hereinbefore described.

In Figure 5 is illustrated a modification of the construction hereinbefore described which is termed a single bee escape and differs from the so-called double bee escape in that it has but a single exit and a single pair of escapement members. The parts, however, of the single bee escape are substantially identical to those already described with the exception of one of the channel members, namely 16, the other, namely, 8 being the same as the corresponding member in a previously described device. The channel member 16 differs from its companion member 8 in that the escapement members are eliminated and the outer end is closed by a transversed end wall 17 which closes one end of the passage and permits the bees to pass through the escape in only one direction.

The features of my invention are more specifically described in the appended claims.

I claim as my invention:

1. A bee escape comprising a sheet metal base plate, a channel member comprising bottom and side walls forming with said base plate a longitudinal passage open at one end, there being provided an inlet opening through said base plate and flanges along the edges of said channel members having flatwise contact with the marginal portions of said base plate, the edges of said flanges and base plate being crimped together.

2. A bee escape comprising a sheet metal base plate having an opening therethrough, a channel plate adapted to be applied to one side of said base plate and having marginal flanges extending lengthwise of and bearing along the marginal portions of said base plate with the edges of said plates crimped together.

3. A bee escape comprising a sheet metal base plate provided with inturned marginal edges along opposite sides thereof, and a channel shaped plate comprising bottom and side walls, the latter having integral marginal flanges, bearing along the edges of said base plate and secured thereto by the crimping of the inturned edges of the base plate over the edges of the flanges.

4. A bee escape comprising a sheet metal base plate, a plurality of similarly formed channel plates each comprising a bottom wall and side walls provided with marginal flanges, said channel plates being applied to said base plate end to end to provide a continuous passageway, and the marginal portions of said base plate being crimped over said flanges.

5. A bee escape comprising a sheet metal base plate, channel shaped plates each comprising a bottom and side walls, and marginal flanges along said side walls, escapement springs fastened to the walls at one end of each plate, and extending toward the opposite open ends, two of such plates being applied to said base plate and the edges of the latter being crimped over said flanges with their corresponding ends in abutting relation, thereby forming a continuous longitudinal passageway open at its ends and an inlet opening thereto formed in said base plate.

In witness whereof, I hereunto subscribe my name this 30th day of April, A. D., 1920.

HERBERT D. ROGERS.